(12) United States Patent
Jensen (10) Patent No.: US 7,876,992 B2
(45) Date of Patent: Jan. 25, 2011

(54) DRUMLESS CABLE REEL

(75) Inventor: Joseph C. Jensen, Lawndale, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 12/323,434

(22) Filed: Nov. 25, 2008

(65) Prior Publication Data

US 2009/0136197 A1    May 28, 2009

Related U.S. Application Data

(60) Provisional application No. 61/004,453, filed on Nov. 27, 2007.

(51) Int. Cl.
*G02B 6/00* (2006.01)
(52) U.S. Cl. ...................................... 385/135
(58) Field of Classification Search ................ None
See application file for complete search history.

(56) References Cited

U.S. PATENT DOCUMENTS

| | | | |
|---|---|---|---|
| 4,244,538 A * | 1/1981 | Theros | 242/118.8 |
| 6,241,181 B1 * | 6/2001 | Campbell | 242/578 |
| 6,575,398 B2 * | 6/2003 | Nakamura et al. | 242/608.7 |
| 6,741,784 B1 * | 5/2004 | Guan | 385/135 |
| 6,902,130 B1 * | 6/2005 | Salem | 242/395 |

FOREIGN PATENT DOCUMENTS

| JP | 62067505 A | * | 3/1987 |
|---|---|---|---|
| JP | 63228103 A | * | 9/1988 |

* cited by examiner

*Primary Examiner*—Sung H Pak
(74) *Attorney, Agent, or Firm*—Michael E. Carroll, Jr.

(57) ABSTRACT

Disclosed are disposable reels and assemblies for holding a cable, thereby aiding the craft in routing cables such as fiber optic drop cables. The reel has a first flange having at least one first tab and at least one first tab slot and a second flange having at least one second tab and at least one second tab slot. First flange is attached to the second flange to form the disposable reel by at least one first tab engaging at least one second tab slot and at least one second tab engaging the at least one first tab slot, thereby forming a hub for the disposable reel that has an accessible space therein. Additionally, fiber optic cable assemblies can further include a connector on one or more ends.

14 Claims, 13 Drawing Sheets

DRUMLESS CABLE REEL

RELATED APPLICATIONS

The present application claims priority to U.S. Provisional Patent Application Ser. No. 61/004,453 filed Nov. 27, 2007 titled "Drumless Cable Reel," which is incorporated herein by reference in its entirety.

FIELD OF THE INVENTION

The present invention relates to reels for fiber optic cables and assemblies. More specifically, the present invention relates to a small form factor reel that is easy to assemble and use for providing the craft with a packaged solution for fiber optic cable and/or assemblies.

TECHNICAL BACKGROUND

Figure 13:
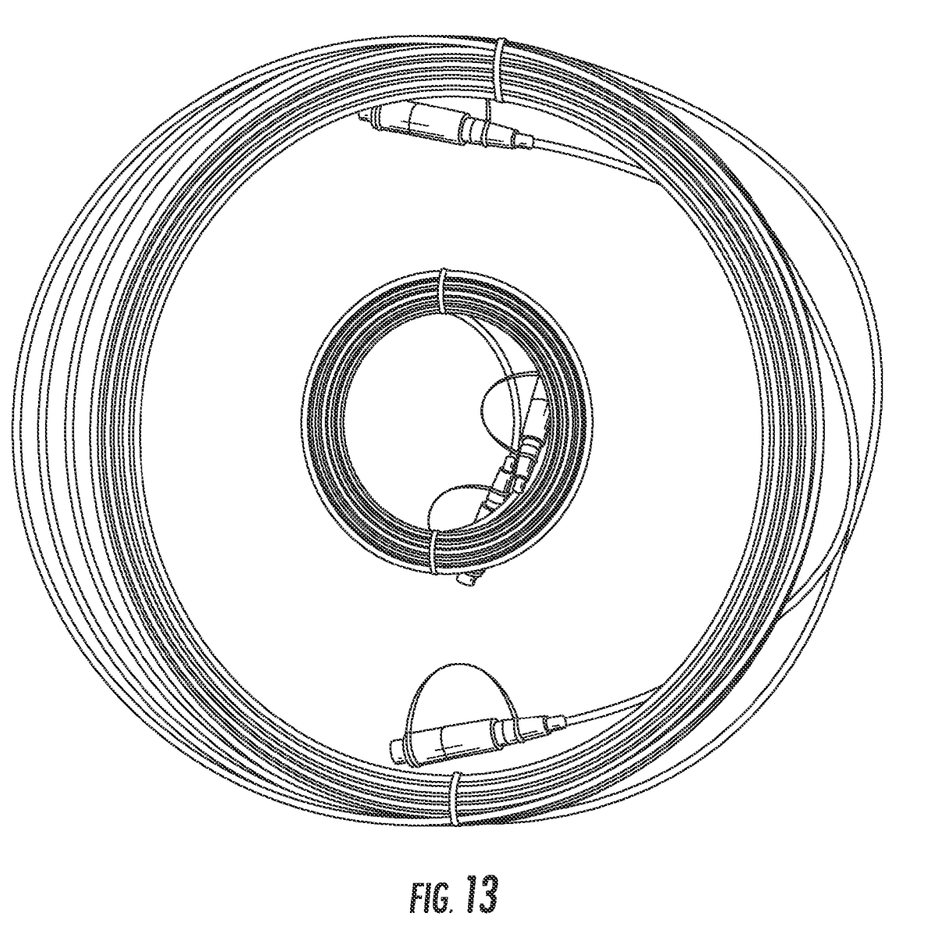
FIG. 13 shows a plan view of fiber optic cable assemblies wound in large diameter as shipped currently and the smaller diameter that the fiber optic cable assembly can form.

Fiber optic cables are being routed deeper into communication networks for increasing the bandwidth available to the subscriber. For instance, fiber optic cables are being routed to the premises of subscribers for fiber to the home (FTTH) applications. Currently, fiber optic drop cables are wound on relatively large drums during manufacturing and the like, then removed therefrom as a relatively large coil such as a 16" coil, which is a limitation of the equipment rather than a coil limitation of the fiber optic cable. FIG. 13 depicts the relatively large 16" coil used currently for shipping fiber optic cables and/or assemblies with a connector such as hardened connector and the smaller diameter that the fiber optic cable and assemblies can form.

Consequently, the fiber optic drop cables are currently being supplied to customers without reels in relatively large loose coils that range in length from about 15 feet to about 2500 feet for FTTH applications. The large loose coils can be difficult to manage in the field and/or factory. For instance, pulling length from the loose coil imparts a twist in the cable. The cost of providing a conventional reel having a solid drum for each these loose coils adds considerable expense for manufacturing the fiber optic cable and/or assembly. Moreover, the craft would have to either dispose or return the conventional reels, which would take up considerable space in vehicles. Due to the increasing volume of fiber drop cables produced annually and the explosive growth of FTTH, a low cost, easily deployable package for fiber optic drop cables is desirable.

SUMMARY

Disclosed are disposable reels and assemblies for holding a cable, thereby aiding the craft in routing cables such as fiber optic drop cables. The reel has a first flange having at least one first tab and at least one first tab slot and a second flange having at least one second tab and at least one second tab slot. Before assembly, the respective tabs on the first flange and second flange are disposed generally in same respective planes of the first flange and the second flange. To assemble the reel, the respective tabs of the flanges are pushed outward (i.e., folded out) from the respective planes of the first flange and second flange. Thereafter, the first flange is attached to the second flange to form the disposable reel by at least one first tab engaging at least on second tab slot and at least one second tab engaging the at least one first tab slot, thereby forming a hub for the disposable reel that has an accessible space therein. Additionally, fiber optic cable assemblies can further include a connector such as a hardened connector or a non-hardened connector on one or more ends.

It is to be understood that both the foregoing general description and the following detailed description present embodiments of the invention, and are intended to provide an overview of framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principals and operation of the invention.

DETAILED DESCRIPTION OF THE PREFERRED EMBODIMENTS

Figure 1:
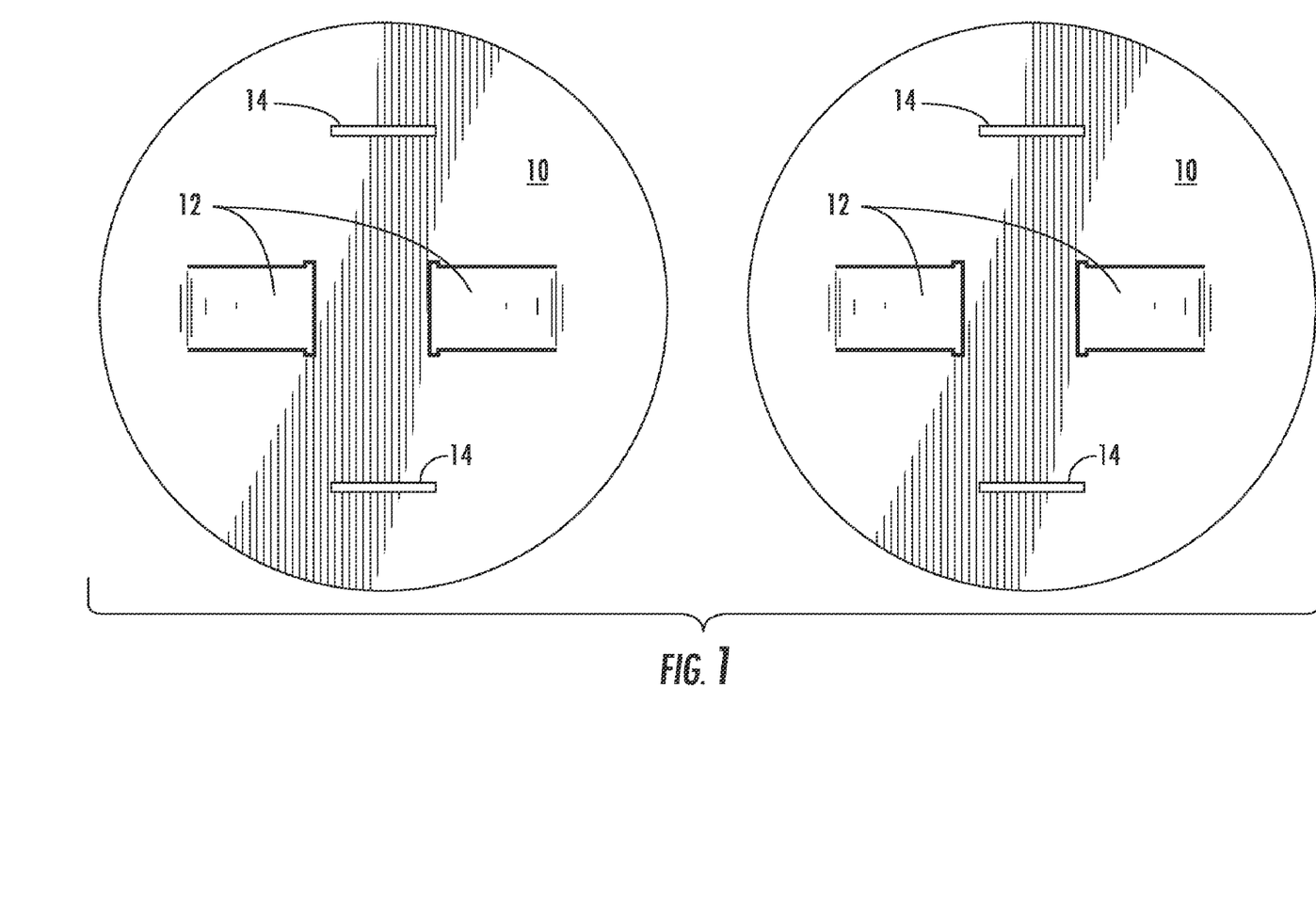
FIG. 1 shows a plan view of exemplary flanges for constructing a reel according to the present invention.

Reference will now be made in detail to the preferred embodiments, examples of which are illustrated in the accompanying drawings. Whenever possible, like reference numbers will be used to refer to like components or parts. FIG. 1 depicts a plan view for a set of exemplary flanges 10 for constructing a reel 100 (i.e., a first flange and a second flange assembled together) according to the present invention. As shown, flanges 10 are similar in shape and size such as round, but other shapes or sizes are possible. As shown, flanges 10 are identical (but could be similar or dissimilar) circular flanges stamped from corrugated plastic, cardboard, solid plastic, corrugated paper, or other suitable material for making reel 100. Each flange 10 has a plurality of tabs 12 such as two tabs punched into flange 10 and a plurality of tab slots 14 (i.e., knockouts) that are matched to the spacing on the tabs (e.g., about 180 degrees for two, about 120 degrees for three, etc.). By way of example, exemplary flanges 10 have tab slots oriented 90 degrees from tabs 12 and on approximately the same arc (i.e., about the same distance from the center). In other words, tabs 12 are about 180 degrees apart and tab slots 14 are about 180 degrees apart with a radial spacing so that tabs 12 and tab slots 14 engage to assemble reel 100 after tabs are folded back.

Figure 2:
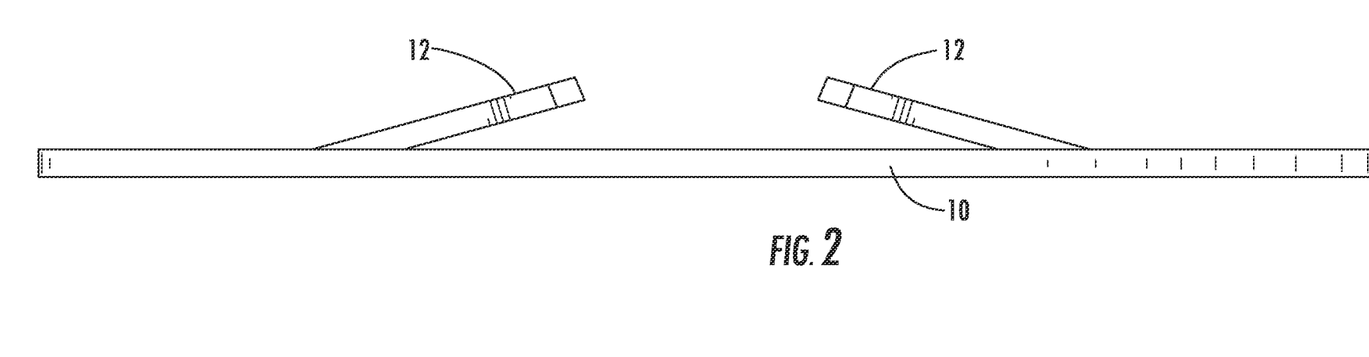
FIG. 2 shows a side view of one of the flanges of FIG. 1 having its tabs pushed out prior to assembly according to the present invention.
Figure 4:
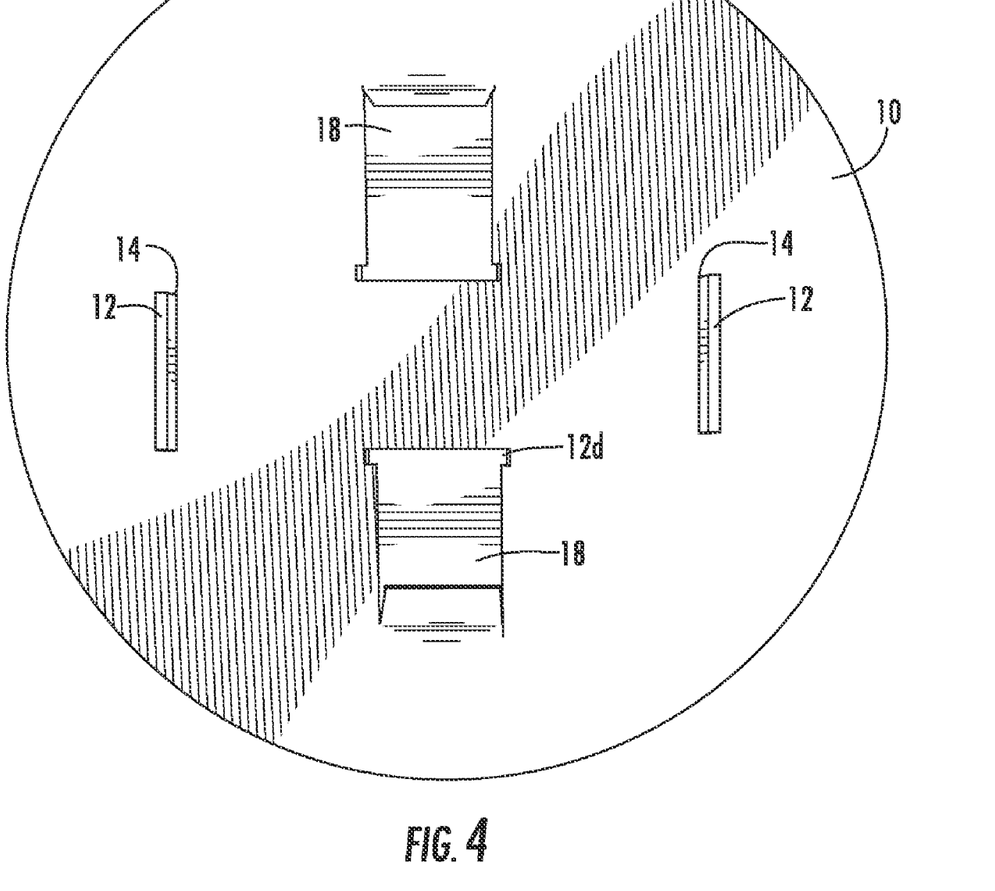
FIG. 4 is a plan view showing the exemplary flanges of FIG. 1 assembled together for making a reel according to the present invention.
Figure 5:
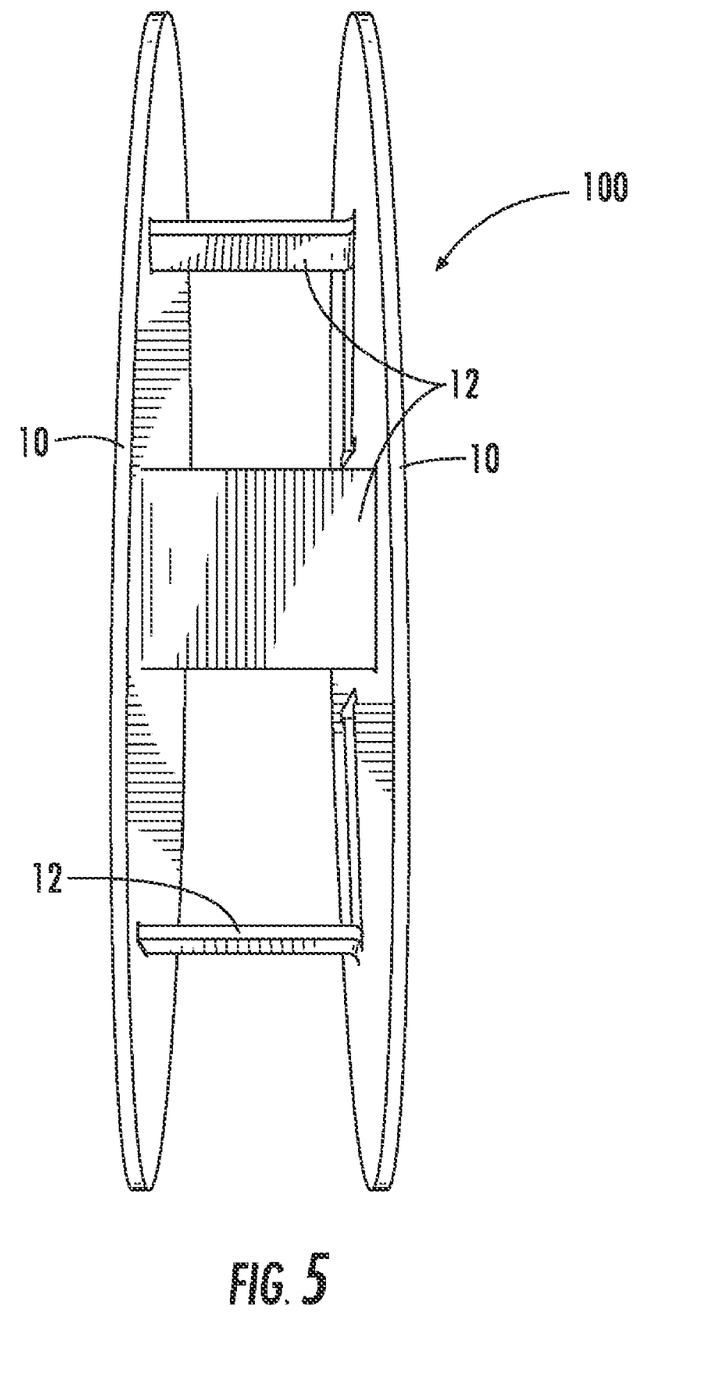
FIGS. 5 and 6 are side views of the assembled reel of the FIG. 1 from different angles.
Figure 6:
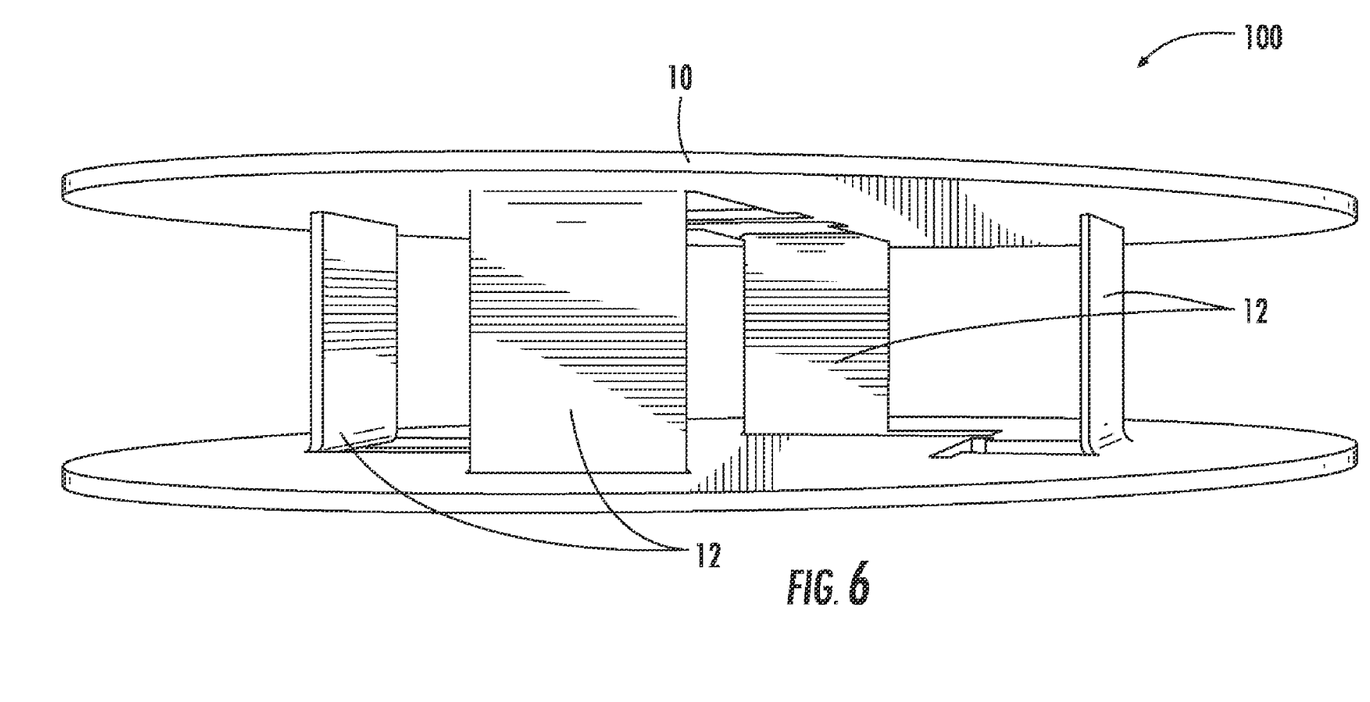

For assembly, flanges 10 are pushed out as shown in FIG. 2 and then folded to a protruding position and a first flange is rotated 90 degrees to align and engage corresponding tab slots 14 on second flange and vice versa. In other words, before assembly the respective tabs on the first flange and second flange are disposed generally in same respective planes of the first flange and the second flange. To assemble the reel, the respective tabs of the flanges are pushed outward (i.e., folded out) from the respective planes of the first flange and second flange. Thereafter, the two flanges 10 are pushed together, thereby forming reel 100 as shown in FIG. 4. When the reel 100 is assembled, cable, wire, or the like can wound thereon. If desired, one could also place a coil of cable on one flange and then could attach the other flange, to form the reel. Reel 100 can also be easily collapsed after usage for re-use or disposal. Reel 100 is relatively inexpensive to manufacture and assembly compared with conventional reels for fiber optic cables.

Figure 3:
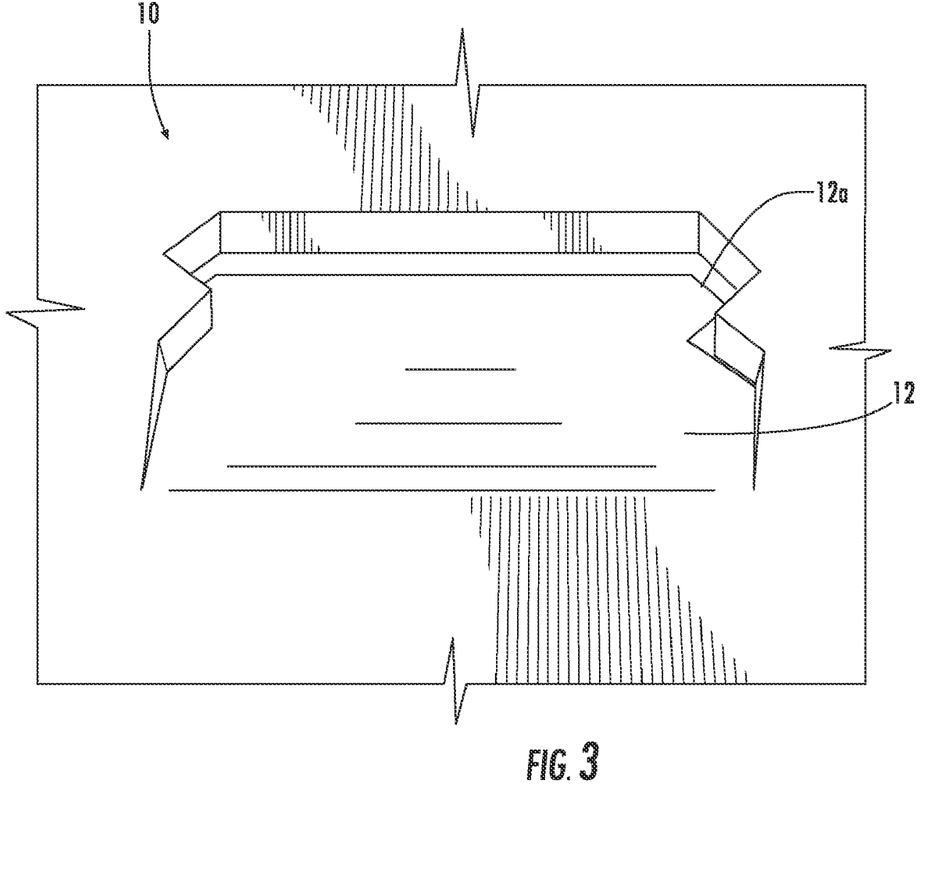
FIG. 3 is an enlarged plan view of the tab of one flange of FIG. 1 showing the cutout shape for the same.

FIG. 3 illustrates an exemplary end-shape 12a for creating a locking effect when engaging tabs 12 with tab slots 14. End-shape 12a (e.g., width and notches) of tabs 12 allows them to be inserted and secured into the slots. As shown, end shapes 12a of tabs 12 have a slight leading edge taper, which could be larger or non-existent. Other shapes are also possible for tabs 12 and/or end-shapes 12a such as shown by FIG. 4. A folding location (not numbered) along with a length for tabs 12 respectively influence a hub diameter and a reel width for reel 100. More specifically, the position of the folding location (i.e., the start point of tab 12) influences the minimum diameter of the hub portion (i.e., the hub created by tabs 12). Smaller diameters for the hub portion can accommodate longer lengths of fiber optic cable, but the diameter of the hub portion should not be smaller than a bend limitation for the intended cable. Likewise, the length of tab 12 influences a width for reel 100 since it determines the spacing between flanges 10 and is one factor influencing the length of fiber optic cable that will fit on reel 100. For example, a reel having a wider width can accommodate longer lengths of fiber optic cable.

Furthermore tabs 12 and tab slots 14 should be orientated onto the material of flanges 10 to provide suitable strength for reel 100. By way of example, if flanges 10 are made from a corrugated plastic or cardboard, the alignment of tabs and tab slots 14 could be orientated parallel, perpendicular, or other variation to the corrugations depending on the impact to the integrity and strength of flange 10 for the given material, ease of assembly, and the like. In other variations, tabs 12 can protrude through the tab slot 14 of the opposing flange and have the end inserted back into a second slot closer to the center of the opposing flange. This "double insertion" tab may provide improved attachment between the flanges, but it increases the complexity of the flanges and assembly for the reel.

Figure 7:
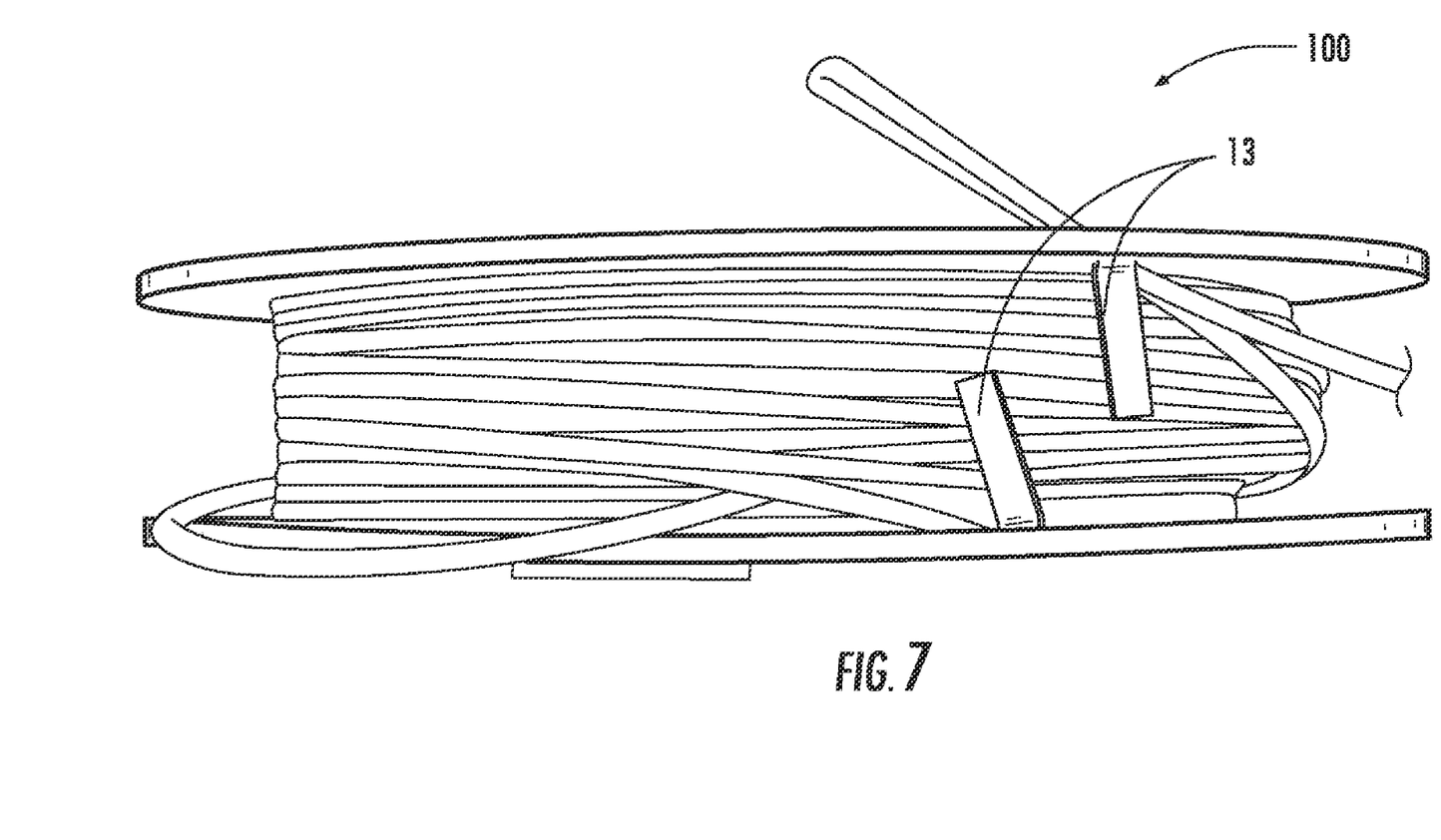
FIGS. 7-10 are various views of the assembled reel of the FIG. 1 having a fiber optic cable or fiber optic assembly disposed thereon.
Figure 8:
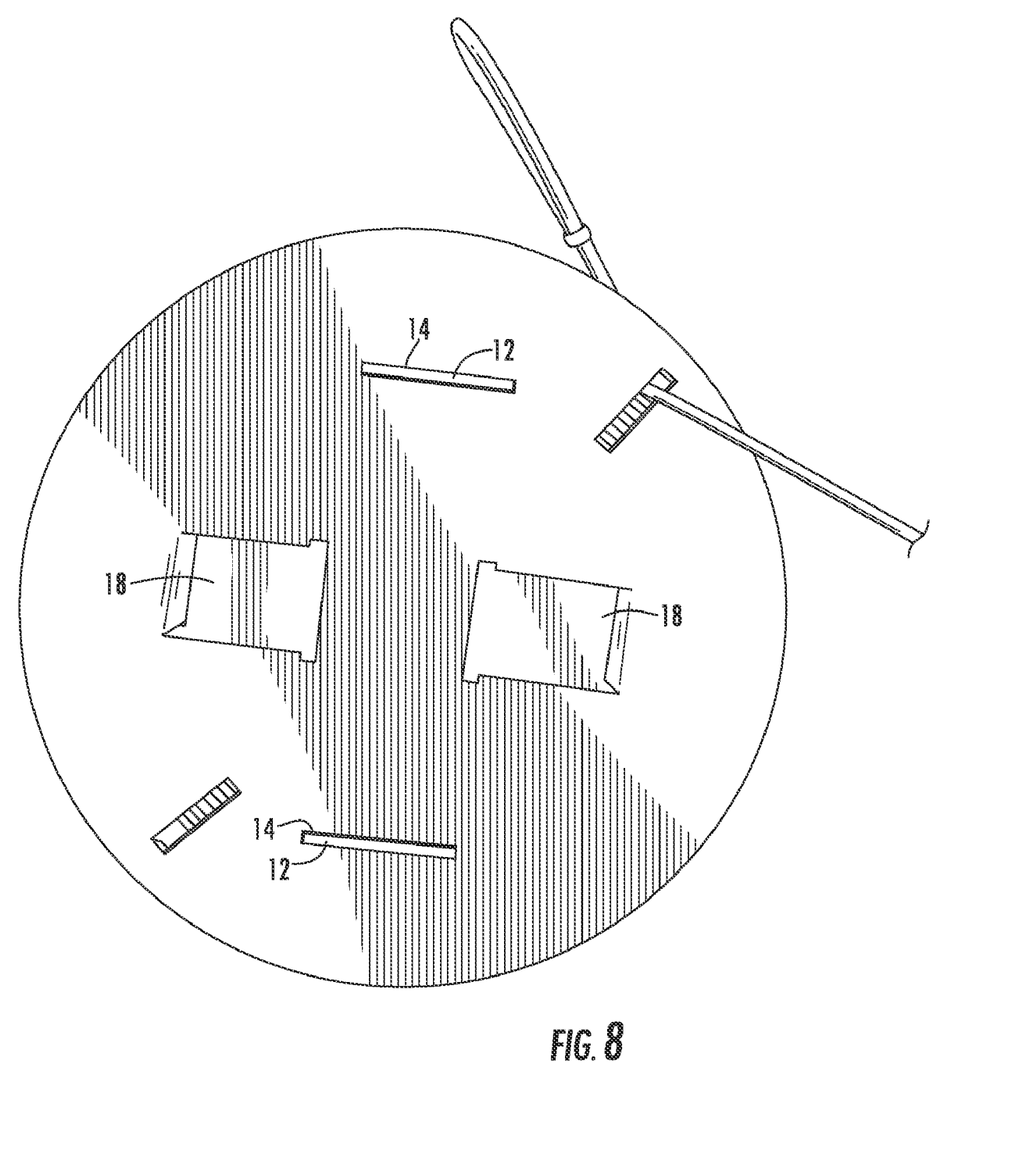
Figure 10:
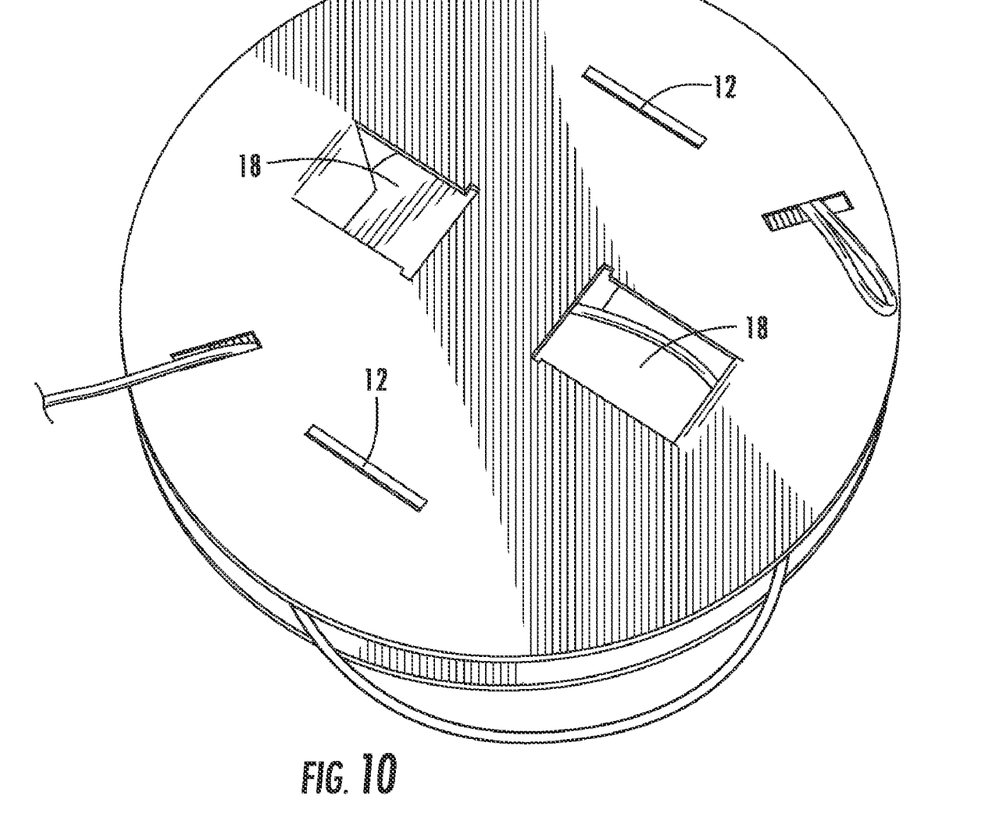

Assembled reel 100 is lightweight yet strong even though it does not include a solid drum like conventional reels. Instead, the fiber optic cable is wound onto the four tabs 14 of the two cooperating flanges 10 that form reel 100 as shown in FIGS. 7 and 8. The use of a plurality of tabs 14 advantageously creates an accessible space within the hub of reel 100 for storing and protecting connectors such as hardened connectors or the like on the ends of the cable (FIG. 10) and the like. In other words, the accessible space within the hub allows the preconnectorized first end of the fiber optic cable to be routed into the center of the reel with ease. This protects the connector while on the reel, facilitates spooling, and provides easy access to both ends of the cable for testing.

Figure 11:
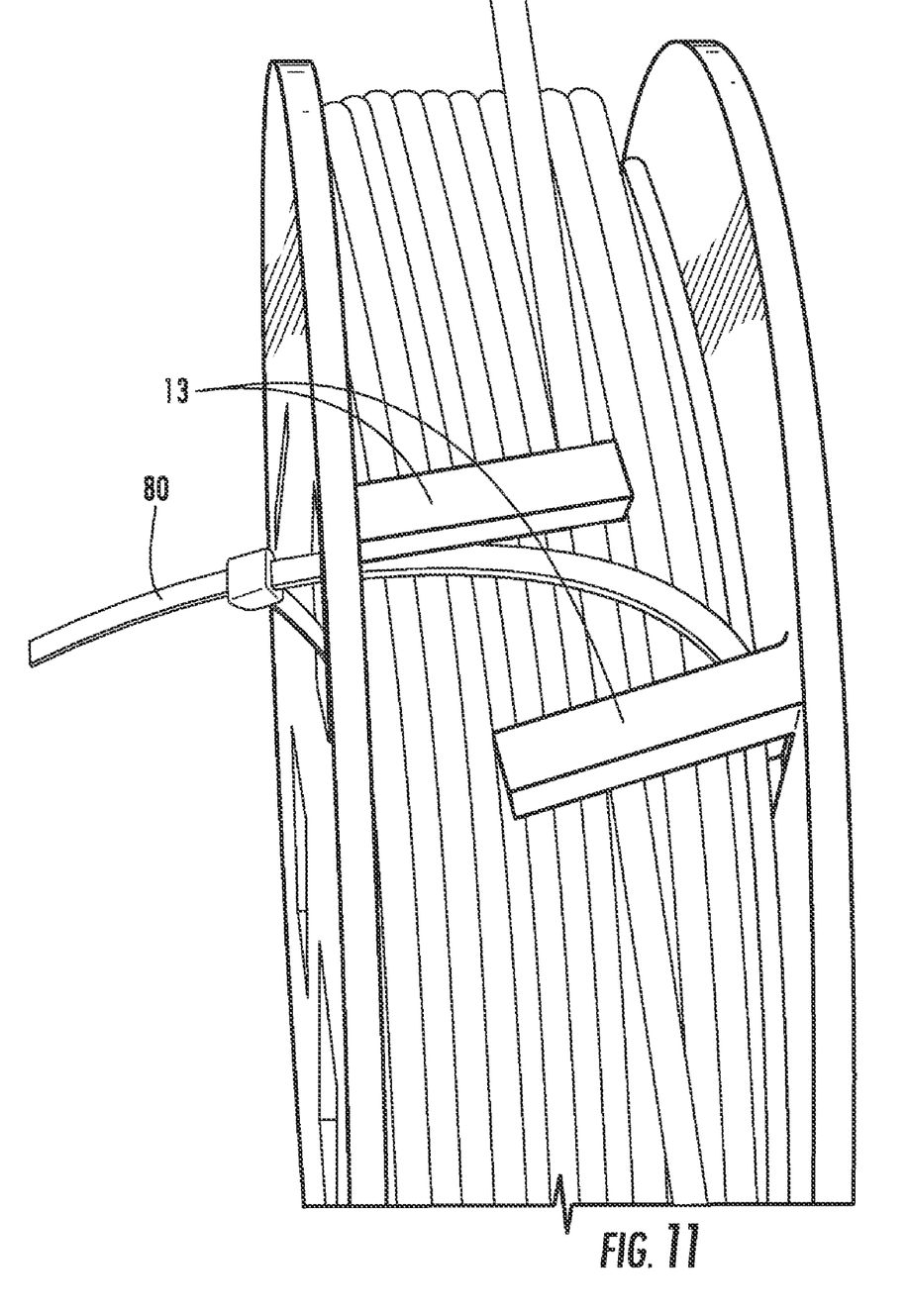
FIGS. 11-12 are various views of the fiber optic cable on an assembled reel with a cable tie for securing the fiber optic cable.
Figure 12:
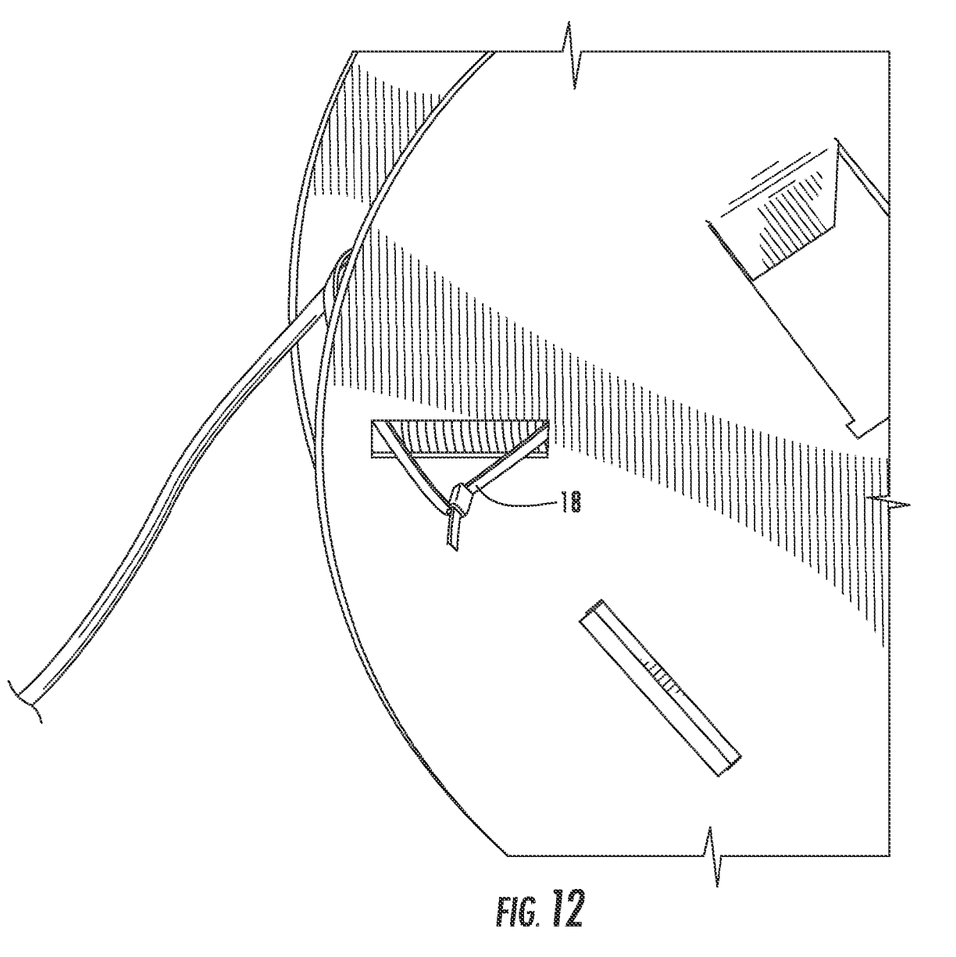

Using an open hub to create an access space instead of a solid drum enables another advantage of the invention. Specifically, the open hub/removable flange allow the factory or craft to easily secure a cable tie 80 to the fiber optic cable for securing it in a coil. Additional openings could also be die-cut into flange(s) 10 to allow for the insertion of cable ties into the flange and around the cable as shown in FIGS. 11 and 12. This feature allows the factory or craft to install cable ties around the remaining cable on the reel prior to disassembly of the flanges. This will decrease time required by the installer for slack management.

Simply stated, reel 100 can be advantageously assembled using two similar pieces cut from the same die to form reel 100 (instead of three or more pieces) which is economical and makes it easy to assemble or disassemble. However, the concepts of the invention can also include other variations that are not identical or similar. By way of example, all of the tabs could be located on the first flange and all the tab slots could be located on the second flange.

Additionally, the two piece design enables a coil of the fiber optic cable to be placed onto one flange of the reel before or after assembly of the reel, thereby increasing productivity and flexibility in manufacturing. Likewise, the fiber optic cable can be loaded (i.e., coiled) onto the reel 100 before loading onto automation equipment for preconnectorization or the like. By way of example, reel 100 has a plurality of windows 18 exposed on each flange 10 that are created after tab 12 is folded inward. Windows 18 give access for allowing components of manufacturing equipment to engage/grab/support the inside surface of tabs 12 on one or both flanges 10 such as during cable coiling. Simply stated, coiling equipment can engage and support tabs 12 through windows 18 to inhibit crushing forces on the hub from back-tension, while also providing a rotation force to reel 100. Simply stated, the fiber optic cable tension applied to reel 100 when coiling fiber optic cable can create significant crushing forces that could deform or crush a reel if tabs were not supported during coiling. By way of example, two opposing coiling heads having a suitably sized U-shape driving mechanism can engage reel 100 from each flange 10 and support tabs 14 while turning the reel for coiling the cable thereon. Once the fiber optic cable is loaded onto reel 100, the back-tension is removed and any pressure is equalized so that the coiling heads may disengage and retract from reel 100 with no issues. Likewise, windows 18 provide grabbing locations for other manufacturing operations. For instance, windows 18 also allow for easy reel placement of the reel and cable onto an automation line. Because windows 18 create a distinct punched out pattern, an automation tray could integrate a similar u-shaped device for allowing an accurate, easy and quick swap out of loaded cable reels either pre- or post-termination onto automation cells. Additionally, flanges 10 of reel 100 may also include an arbor hole (not shown) disposed near the center for winding and/or unwinding the fiber optic cable in the field.

Further, reel 100 advantageously provides a quick and easy disassembly with the fiber optic cable and/or assembly thereon for speedy slack storage of the excess length when installing the same. More specifically, one or more tabs may be removed or one of the flanges that form the drum can easily be pulled off to expose the fiber optic cable coil while maintaining the integrity of the coil. Moreover, cable ties can be secured to the fiber optic cable intended for slack storage. This allows the craft technician to remove the coil from the reel and insert the coil directly on or into the slack storage device without the needing to recoil the fiber optic cable. This results in a significant time savings for the craft by eliminating the need to wind the cable for slack storage.

Figure 9:
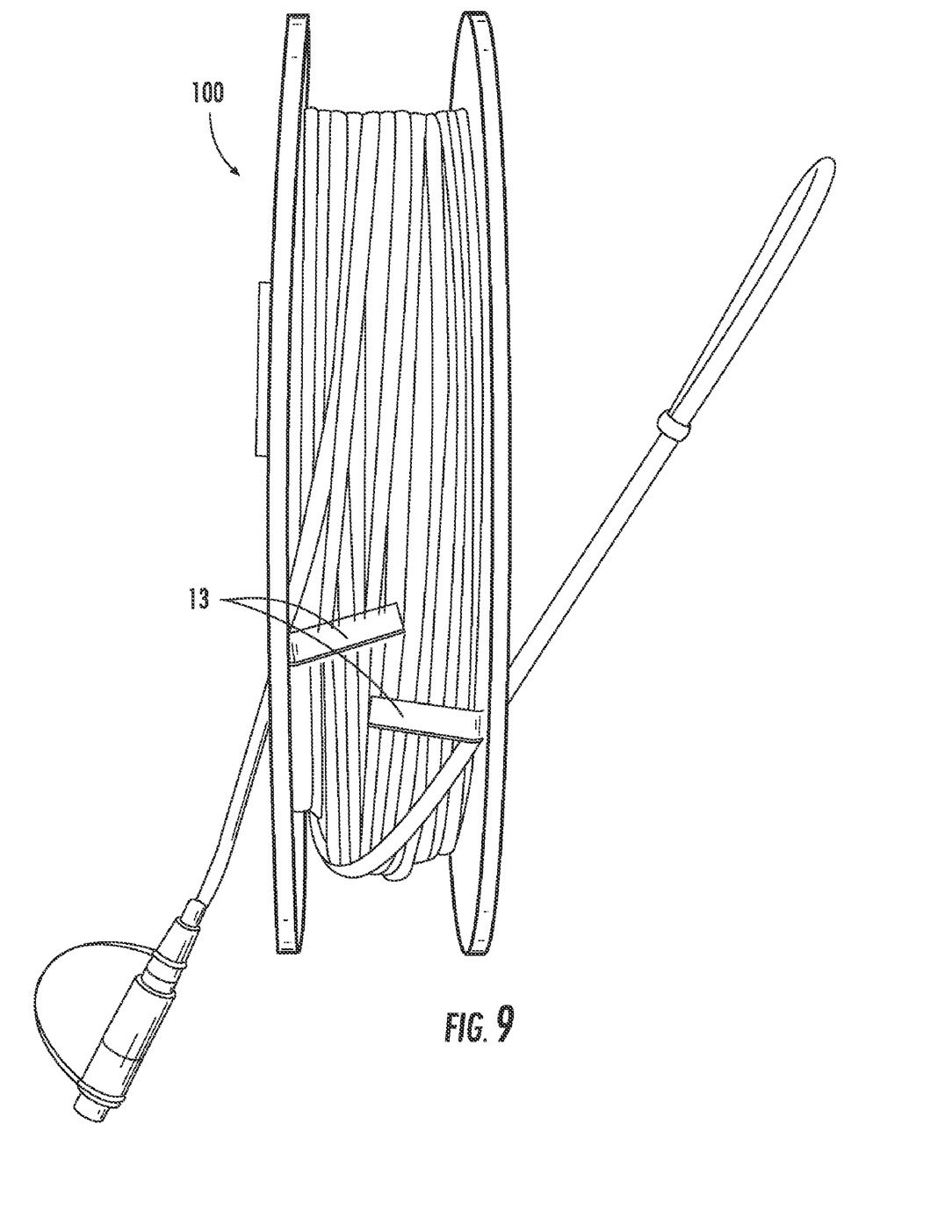

As best shown in FIGS. 7 and 9, flanges 10 can include backlash tabs 13 that are punched out near the perimeter of flanges 10 to act as a deterrent for inhibiting cable from spooling off the reel due to the nature of the cable to uncoil itself. As shown by FIGS. 8 and 9, each flange 10 has one or more backlash tabs 13 that end up being at about the same location when the reel is assembled. Consequently, the potential energy stored in the cable coil is inhibited from unspooling cable on the reel. Additionally, as shown one or more ends of the fiber optic cable may protrude out of one of the backlash tabs 13 to make an end easy to locate, but the cable end may protrude from other portions of the reel.

Reels of the invention also offers an integrated stack lock feature by permitting multiple reels to be stacked one on top of the other. This is achieved by the tab and slot design configuration. Because the tabs and slots are 90 degrees opposed and aligned, when multiple assembled reels are stacked upon one another, the tab which protrudes past the slot will protrude into the tab cutout of the reel just above or below the reel. This integrated feature allows multiple reels to be stacked with ease and strengthens a bulk package of assembled reels. This feature eases the ability to pack and ship multiple reels using a larger box, crate, wrap, or the like.

Reels may also include features for identifying the cable/connector thereon. For instance, flange 10 could include identifying features such as printing, marking and/or a decal suitable for marking so the factory could indicate the length of cable and/or the type of connector on the end of the cable. Likewise, a pull-out tab, knockout or the like could be a portion of one of the flanges, which is useful for identification of the cable/connector on the reel, thereby eliminating the need for markers or pens to identify the cable length or connector type.

Many modifications and other embodiments of the present invention, within the scope of the claims will be apparent to those skilled in the art. Although the invention was described with respect to fiber optic cables, the concepts can be applied to other types of cable such as copper communication cables, copper data cables, wires, electrical cables, etc. Thus, it is intended that this invention covers these modifications and embodiments as well those also apparent to those skilled in the art.

I claim:

1. A disposable reel for holding a cable, comprising:
a first flange having at least one first tab with a leading edge taper and at least one first tab slot, wherein the first tab is folded out from the first flange;
a second flange having at least one second tab with a leading edge taper and at least one second tab slot, wherein the second tab is folded out from the second flange and the first flange is attached to the second flange to form the disposable reel so that the at least one first tab engages at least one second tab slot and at least one second tab engages the at least one first tab slot, thereby forming a hub for the disposable reel that has an accessible space therein; and
a fiber optic cable disposed on the reel, wherein one of the flanges further includes a backlash tab formed therein.

2. The disposable reel of claim 1, the first flange having at least two first tabs and at least two first tab slots for attaching the first flange to the second flange and the second flange having at least two second tabs and at least two second tab slots for attaching the second flange to the first flange.

3. The disposable reel of claim 1, the first flange having a plurality of windows space about 180 degrees apart.

4. The disposable reel of claim 1, further including a fiber optic cable thereon, wherein the fiber optic cable further includes a connector on the end.

5. The disposable reel of claim 1, wherein the first flange has the same number of tabs as the second flange.

6. A fiber optic cable packaged on a disposable reel, comprising:
a reel having a first flange having at least one first tab with a leading edge taper and at least one first tab slot and a second flange having at least one second tab with a leading edge taper and at least one second tab slot, wherein the at least one first tab is folded out from the first flange and attached to the second flange to form the disposable reel so that the at least one first tab engages at least one second tab slot and at least one second tab engages the at least one first tab slot, thereby forming a hub for the disposable reel that has an accessible space therein; and
a fiber optic cable, the fiber optic cable being disposed on the reel and having at least one connector on an end of the cable to form an assembly, wherein the end of the assembly is secured to the reel.

7. The disposable reel of claim 6, the first flange having at least two first tabs and at least two first tab slots for attaching the first flange to the second flange and the second flange having at least two second tabs and at least two second tab slots for attaching the second flange to the first flange.

8. The disposable reel of claim 6, the first flange having a plurality of windows space about 180 degrees apart.

9. The disposable reel of claim 6, one of the flanges further including a backlash tab.

10. The disposable reel of claim 6, wherein the first flange has the same number of tabs as the second flange.

11. A fiber optic cable packaged on a disposable reel, comprising:
a reel having a first flange having at least one first tab with a leading edge taper and at least one first tab slot and a second flange having at least one second tab with a leading edge taper and at least one second tab slot, wherein the at least one first tab is folded out from the first flange and attached to the second flange and at least one second tab is folded out from the second flange and attached to the first flange, thereby forming the disposable reel by having the at least one first tab engage at least one second tab slot and at least one second tab engages the at least one first tab slot; and
a fiber optic cable having a hardened connector, the fiber optic cable and hardened connector being disposed on the reel.

12. The disposable reel of claim 11, the first flange having a plurality of windows space about 180 degrees apart.

13. The disposable reel of claim 11, one of the flanges further including a backlash tab.

14. The disposable reel of claim 11, wherein the first flange has the same number of tabs as the second flange.

* * * * *